Figures 1, 2:
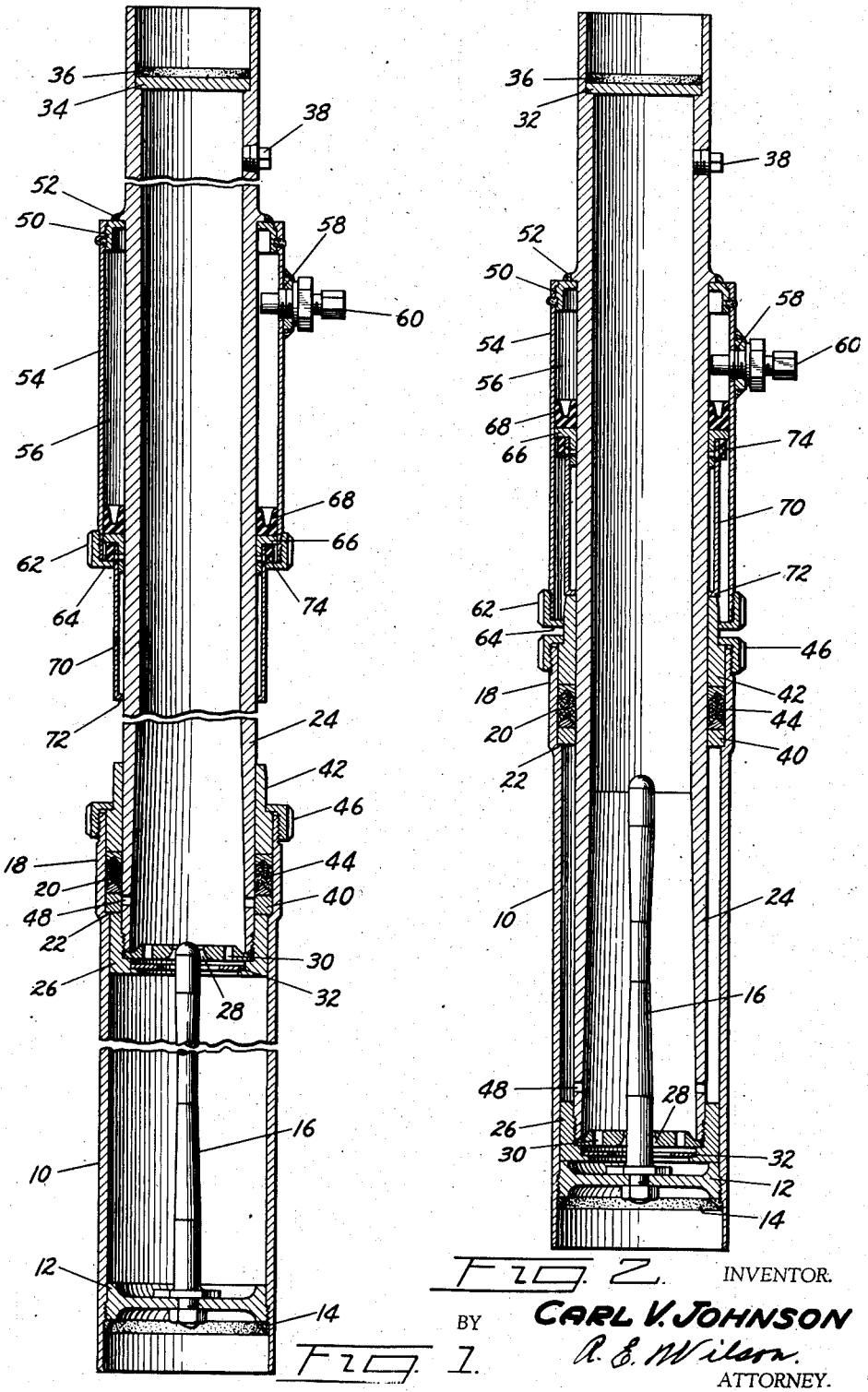

Dec. 31, 1940.   C. V. JOHNSON   2,227,261
SHOCK STRUT
Original Filed May 19, 1937

INVENTOR.
CARL V. JOHNSON
BY R. E. Wilson
ATTORNEY.

Patented Dec. 31, 1940

2,227,261

UNITED STATES PATENT OFFICE 2,227,261

SHOCK STRUT

Carl V. Johnson, South Bend, Ind., assignor to Bendix Aviation Corporation, South Bend, Ind., a corporation of Delaware Original application May 19, 1937, Serial No. 143,456. Divided and this application August 17, 1939, Serial No. 290,648

3 Claims. (Cl. 267—64)

This invention relates to shock absorbing means, and is illustrated as embodied in a shock strut for an airplane landing gear.

An object of the invention is to provide a simple and rugged structure in the strut for yieldingly carrying the load of the plane in taxying, after the shock of landing has been absorbed. Various features of novelty, and the details of an improved construction, will be apparent from the following description of the illustrative embodiment shown in the accompanying drawing, in which:

Figure 1 is a vertical sectional view of a shock absorbing strut embodying the invention illustrating the strut in extended position; and Figure 2 is a vertical sectional view illustrating the same strut in the compressed position.

A preferred embodiment of the invention illustrated in Figures 1 and 2 of the drawing includes a cylindrical casing 10 having threaded in its lower end a diaphragm or support 12 retained against displacement by a welding bead 14. The bead also serves to seal the lower end of the casing against leakage; and a metering pin 16 of conventional type is suitably mounted on the support 12 within the casing. The upper end of the casing 10 has a portion slightly enlarged in diameter as at 18 providing a packing chamber 20 and an annular shoulder 22.

A cylindrical casing 24, telescoping the casing 10, has suitably secured to its lower end a piston 26 reciprocable in the casing 10. The piston has a concentric orifice 28 for cooperation with the metering pin 16 and a plurality of spaced ports 30 controlled as by a flap valve 32 operative to close the ports 30 during the compression stroke of the piston. The upper end of the casing 24 is closed as by a diaphragm 34 secured against displacement by a welding bead 36. The bead also serves to seal the upper end of the casing against leakage; and a filling opening in the wall of the casing adjacent the diaphragm 34 is normally closed as by a plug 38.

The casing 24 and the casing 10 are suitably secured together. As shown, the casing 24 is adapted to slide smoothly through a ring 40 seated on the annular shoulder 22 in the packing chamber 20 and a collar 42 in the open end of the packing chamber 20. Suitable packing material 44 is interposed between the ring 40 and the collar 42, and a retaining ring 46 threaded on the packing chamber serves to secure the assembly against displacement.

The casing 24 has arranged in its wall just back of the head of the piston 26 a plurality of ports 48 providing communications between the casing 10 and the casing 24. When the strut is in extended position and the piston fully retracted, these communications are closed by the ring 40 in the packing chamber 20. Upon collapse of the strut and the resultant movement of the piston, as when landing, the ports 48 are uncovered. This establishes communication between the casings 10 and 24, and results in materially increasing the area, and lowering to a marked degree the pressure in the strut. As the strut again resumes its extended position the fluid returns from the casing 10 through the ports 48 into the casing 24.

Suitable means for resiliently supporting the load after the initial shock of landing has been absorbed and for limiting the extension of the strut, due to the resilient means, to a certain portion of the total stroke when the plane is landing is provided. As shown, a collar or ring 50 sleeved on the casing 24 is fixedly secured thereto as at 52 and supports a cylindrical casing 54 by one of its ends in concentric relation to the casing 24. This casing 54 provides in conjunction with the wall of the casing 24 an annular chamber 56 having a filling opening 58 normally closed by a plug 60 including a check valve, not shown, and suitably attached to the other end of the casing 54 is a collar 62 having an inturned flange 64, the purpose of which will hereinafter appear.

An annular piston 66 reciprocable on the casing 24 within the chamber 56 has on its head a leak-proof cup 68 for inhibiting seepage of air from the cylinder 56 past the piston. A sleeve 70 telescoping the casing 24 has one of its ends secured to the annular piston 66 and the other end of the sleeve 70 is provided with an inturned flange 72 adapted to engage the collar 42 upon collapse of the strut but only after the initial shock of landing has been absorbed. The piston 66 also has secured to its back a flexible ring 74 adapted to seat on the retaining ring 64 when the piston is in fully retracted position.

Assuming that the strut is filled with suitable fluid up to a level slightly above the piston 26, that the remaining portion of the strut is filled with air under light pressure or at atmospheric pressure, and that the chamber 56 is filled with air or gas under high pressure, under these conditions, the strut under impact of landing causes the fluid in the casing 10 to actuate the valve so as to close the ports 30, and thereafter the fluid is forced through the orifice 28 in the head of the piston 26 past the metering pin 16 into the casing 24. This results in effectively damping the initial shock of landing. During this operation the fluid flows from the casing 24 through the ports 48 into the casing 10 back of the piston 26, resulting in relieving to a marked degree the pressure on the fluid in the strut.

Upon absorbing a predetermined portion of the shock of landing, the flange 72 of the sleeve 70 engages the collar 42 and transfers a portion of the load to the piston 66 attached to the sleeve 70. Movement of the piston 66 is resisted by the pressure on the air or gas in the chamber 56. Accordingly, the load is resiliently supported when the airplane settles on the ground and when the airplane is taxying.

When the plane takes off or ascends, the strut returns to its fully extended position. As the plane ascends, air or gas under pressure in the chamber 56 returns the annular piston 66 to its extended position, and as the piston returns to its extended position force is transmitted therefrom through the sleeve 70 to the casing 10, resulting in movement of the casing 10 corresponding to the movement of the piston 66. Further movement of the casing 10 to its fully extended position results from the pressure on the liquid in the strut, the weight of the casing 10 and the landing gear attached thereto, and as the strut assumes its fully extended position the fluid in the casing back of the piston 26 is returned therefrom through the ports 48 to the casing 24 as the fluid in the strut settles to a level slightly above the piston.

While one embodiment has been described in detail, it is not my intention to limit the scope of the invention to that particular embodiment, or otherwise than by the terms of the appended claims. The present application is a division of my application No. 143,456, filed May 19, 1937, patented April 16, 1940, as Patent No. 2,197,474.

I claim:

1. A shock strut having telescoping tubes of different diameters, a short tube coaxially surrounding and spaced from the smaller of said tubes some distance from the end of the larger tube, means securing the short tube to the smaller of said tubes at the end opposite the larger tube and for closing said end of the short tube, a floating annular piston in the space between the short tube and said smaller tube, and means for causing the larger tube to operate the annular piston after a predetermined stroke of said telescoping tubes.

2. A shock strut having telescoping tubes of different diameters, a short tube coaxially surrounding and spaced from the smaller of said tubes some distance from the end of the larger tube, means securing the short tube to the smaller of said tubes at the end opposite the larger tube and for closing said end of the short tube, a floating annular piston in the space between the short tube and said smaller tube and which has a sleeve projecting toward the end of the larger tube, and means at the end of the larger tube for engaging said sleeve to operate the annular piston after a predetermined stroke of said telescoping tubes.

3. In a shock strut, two telescoping members, means affixed to the exterior of one of said telescoping members to form an axially parallel chamber, a piston adapted to fit said chamber, and means exterior to both telescoping members operable upon the telescoping of the members to cause said piston to traverse its chamber.

CARL V. JOHNSON.